United States Patent [19]

Le et al.

[11] Patent Number: 4,678,764

[45] Date of Patent: Jul. 7, 1987

[54] REACTIVATION OF NOBLE METAL-ZEOLITE CATALYSTS

[75] Inventors: Quang N. Le, Cherry Hill, N.J.; Ying-Yen P. Tsao, Langhorne, Pa.; Stephen S. Wong, Medford, N.J.

[73] Assignee: Mobil Oil Corporation, New York, N.Y.

[21] Appl. No.: 800,581

[22] Filed: Nov. 21, 1985

[51] Int. Cl.$^4$ .......... B01J 29/38; B01J 23/96; B01J 38/66; B01J 38/60

[52] U.S. Cl. .......... 502/26; 208/111; 208/120; 208/140; 502/22; 502/25; 502/27; 502/28; 502/37; 502/517; 585/481; 585/739

[58] Field of Search .......... 502/28, 27, 26, 25, 502/22, 517, 37, 517; 208/140

[56] References Cited

U.S. PATENT DOCUMENTS

| | | |
|---|---|---|
| 3,235,486 | 2/1966 | Constabaris et al. .......... 208/111 |
| 3,236,205 | 6/1966 | Constabaris et al. .......... 252/413 |
| 3,684,738 | 8/1972 | Chen .......... 502/27 |
| 3,986,982 | 10/1976 | Crowson et al. .......... 208/111 |
| 4,055,482 | 10/1977 | Robson .......... 502/26 |
| 4,148,749 | 4/1979 | Ab Der Halden et al. .......... 208/140 |
| 4,148,750 | 4/1979 | Pine .......... 252/416 |
| 4,190,553 | 2/1980 | Ward .......... 502/26 |
| 4,419,220 | 12/1983 | LaPierre et al. .......... 208/111 |
| 4,522,928 | 6/1985 | McVicker et al. .......... 502/28 |

*Primary Examiner*—P. E. Konopka
*Attorney, Agent, or Firm*—A. J. McKillop; M. G. Gilman; L. P. Hobbes

[57] ABSTRACT

A method for reactivating noble metal-containing zeolites containing sulfur oxide poisoned noble metal such as oxygen regenerated platinum zeolite beta catalysts, by contacting the catalyst with an acidic aqueous solution having a pH below about 7. The solution contains a Bronsted acid compound having a dissociation constant ranging from about $1 \times 10^{-14}$ to about $2 \times 10^{-1}$.

24 Claims, No Drawings

REACTIVATION OF NOBLE METAL-ZEOLITE CATALYSTS

The present invention relates to a method for reactivating noble metal-containing zeolite hydrocarbon conversion catalysts. Such catalysts whose noble metal component has been deactivated during oxidative regeneration, are activated by contact with an aqueous acidic solution.

The deactivation of noble metal-containing hydrocarbon conversion catalysts due to the deposition on the catalyst of carbonaceous residues is a well-known phenomenon which has received much attention in the technical and patent literature. The problem with regard to catalyst deactivation is particularly acute with respect to supported noble metal-containing catalysts employed in the reforming of naphtha feedstocks. Undesired metal migration and agglomeration can occur during preparation, calcination, or oxidative regeneration of such catalysts, resulting in significant losses in catalyst properties such as activity. It is also believed that noble metal deactivation can occur not only by agglomeration but by the association of a noble metal component with a material which chemically poisons the noble metal surface. One such poisoning phenomenon is believed to arise from the association of sulfur oxide, e.g. $SO_3$ and $SO_4$ with the noble metal. This can occur, for example, during oxidative regeneration of the catalyst when sulfur contaminants in the reactor are deposited on the catalyst. A significant reduction in hydrogen, oxygen and/or carbon monoxide chemisorption capacities of the catalyst will often result.

We have now found that the deactivated noble metal function can be recovered by contacting the deactivated catalyst with a liquid aqueous solution to which a Bronsted acid compound having a dissociation constant ranging from about $1 \times 10^{-14}$ to about $2 \times 10^{-1}$ has been added. The resulting aqueous solution can have a pH below about 7.

Treatment of noble metal-containing zeolites with ethylenediamine tetraacetic acid (EDTA) to improve noble metal dispersion is disclosed in U.S. Pat. No. 4,148,750 to Pine. U.S. Pat. Nos. 3,235,486 and 3,256,205 to Constabaris et al disclose the reactivation of non-noble Group VIII metal-containing zeolites prior to regeneration by contact with a weakly acidic aqueous solution which converts the metal components into a soluble salt which is redistributed on the catalyst support. All of these references suggest a method of reactivation which entails initial redispersion. Treatment with aqueous acidic solution to reactivate, but not to redisperse the metal component of regenerated noble metal containing catalysts is believed to be novel.

The catalyst treated by the method of the present invention contains at least one platinum group metal such as platinum, palladium, iridium, osmium, rhodium and ruthenium. Where said catalyst contains more than one metal, the other metal or metals can be selected from the group consisting of Group IB, Group IVB, Group VIIA, and Group VIII metals. Generally, the catalyst treated by the present invention has a noble metal content ranging from about 0.01 to 10 weight percent, preferably about 0.1 to 3 weight percent.

The supported noble metal-containing catalysts that are activated by the process of the present invention comprise a zeolite in combination with a hydrogenation-dehydrogenation component containing a noble metal. Such noble metals can include platinum, palladium, and rhodium. As used here, the term "zeolite" includes not only a crystalline aluminosilicate, but any crystalline silicate, e.g., a metallosilicate, having the crystal structure of a zeolite.

The zeolites which may be rejuvenated by the process of the present invention include large pore zeolites such as zeolite Z, zeolite Y, zeolite beta, ZSM-3, ZSM-4, ZSM-18 and ZSM-20, as well as medium pore zeolites such as ZSM-5, ZSM-11, ZSM-5/ZSM-11 intermediates, ZSM-12, ZSM-23, ZSM-35, ZSM-38, ZSM-48 and other materials, including crystalline silicates having the crystal structure of these zeolites.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Pat. No. 3,308,069. That description, including the X-ray diffraction pattern of zerolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35, a synthetic ferrierite-type material, is described in U.S. Pat. No. 4,016,245. The description of that zeolite, and particularly the X-ray diffraction pattern thereof, is incorporated herein by reference.

ZSM-38, a synthetic ferrierite-type material, is described in U.S. Pat. No. 4,046,859. The description of the zeolite, and particularly the specified X-ray diffraction pattern thereof, is incorporated herein by reference.

ZSM-48 is more particularly described in U.S. Pat. No. 4,397,827, the entire contents of which are incorporated herein by reference.

The present invention is particularly useful in reactivating catalysts employed in isomerization processes such as isomerization dewaxing. These catalysts, such as those containing noble metal-containing zeolite beta, are described further in U.S. Pat. No. 4,419,220, incorporated herein by reference. It is generally preferred that the zeolites treated in the present invention be acid resistant, i.e., a material able to retain its crystallinity, as measured by X-ray and sorption capacity, in the presence of acid.

The present invention is useful in reactivating noble metal-containing zeolite catalysts which are in a deactivated state attributable at least in part to sulfur oxide poisoning of the noble metal function. When it becomes apparent that a catalyst has become so deactivated, for example, during oxidative regeneration, the catalyst is contacted with an aqueous solution containing a Bronsted acid compound having a dissociation constant ranging from about $1 \times 10^{-14}$ to about $2 \times 10^{-1}$. Sufficient quantities of the Bronsted acid are added to give the aqueous solution a pH below about 7, preferably below about 6, say about 0.1 to 5.

The method of the present invention may be used either in place of or in combination with conventional reactivation methods. In particular, it is believed useful when used in conjunction with reactivation methods which serve to disperse noble metals which have become agglomerated during use of the catalyst. Such methods include $H_2$—$O_2$ redox processes and halogen activation methods. When the acid-treated zeolites of the present invention are subjected to chlorine activation methods, it has been found that noble metal dispersion is also greatly enhanced. One such halogen activation method comprises contacting the acid extracted catalyst with a halogen-containing gas. For example, a mixture of chlorine, oxygen, water and nitrogen may be used. Such a mixture may contain 2 to 20 torr chlorine, 0 to 4000 torr oxygen, 0 to 50 torr $H_2O$ and the remainder nitrogen. Preferably the mixture contains about 5 to 12 torr chlorine, 200 to 400 torr oxygen, and 0 to 10 torr $H_2O$, with the remainder being nitrogen. Contacting temperatures may range from 400° to 500° C., preferably 430° to 470° C. and such contacting may be carried out 2 to 10 hours, preferably 3 to 5 hours.

The zeolite catalyst treated by the present invention may be combined with an inorganic oxide support such as silica, alumina, or silica-alumina.

The Bronsted acid compounds suited to use in the present invention include ammonium salts, e.g. ammonium carbonate and ammonium nitrate, organic acids such as acetic acid and formic acid, hydrogen peroxide, nitric acid and the hydrogen halides, such as hydrogen fluoride and hydrogen chloride. Mixtures of these Bronsted acid compounds may also be used, for example, hydrogen fluoride and hydrogen peroxide.

In the present invention, the catalyst is contacted with the aqueous solution at temperatures ranging from about 25° to 100° C., preferably ranging from about 25° to 80° C. and pressures of about 15 to 600 psig, preferably about 15 to 400 psig. Contact times may range from about 0.5 to 10 hours, preferably about 0.5 to 2. Generally, it has been observed that the leaching out of the poisoning sulfur oxide is enhanced by increasing the contacting temperature, say 20° to 30° C. above room temperature. Moreover, subsequent treatments with the aqueous solution have been found to further reduce the sulfur oxide content of the catalyst.

The sulfur oxide removal efficiency has also been found to be related to the pH of the aqueous solution employed. Increasing acidity appears to improve sulfur oxide extraction. Ammonium salts are found to be more effective than the strong acids at higher pHs.

The noble metal of the zeolite catalysts treated by the method of the present invention may preferably be in a reduced or sulfided form.

The present inventon is further described by the following examples.

EXAMPLE 1

An aged isomerization dewaxing catalyst (0.6 wt % Pt on an alumina bound steamed zeolite beta) containing 15 weight percent coke was regenerated under simulated commercial regeneration conditions (100 psig, 60 torr $H_2O$, 1–7% $O_2$, max. 454° C.). The regenerated catalyst whose properties are set out in Table 1 was then treated with various aqueous solutions with the pH ranging from 0.1 to 7.0 at 25° C., 1 atm. for 1 hour. The treated samples were then oven dried at 100° C. for 24 hours. Both untreated and treated catalysts were reduced at 200° C. and then tested for hydrogen and oxygen chemisorption. The results are tabulated in Table 2.

The results indicate that the aqueous extraction significantly enhances hydrogen and oxygen chemisorption properties. Table 3 compares the Pt chemisorptive properties and X-ray analysis of the regenerated catalyst before and after extracting with a hydrogen peroxide solution (4.7 pH). This hydrogen peroxide treatment removed about 51% sulfate sulfur and activated the Pt functions as indicated by the increase in both hydrogen and oxygen chemisorption. A similar effect was also observed with CO adsorption measurements by FTIR. X-ray analysis showed no change in large Pt crystallites (~50 Å) indicating that extraction treatment did not significantly alter Pt size distribution. These results clearly confirm the relationship between Pt metal function and sulfur-related poisoning of the metal.

EXAMPLE 2

A sample of the regenerated catalyst of Example 1 was extracted with aqueous $HNO_3$ solutions prepared at various dilution levels (pH ranging from 4.5 to 0.1). The results are shown in Table 4. The data indicate that increasing acidity improved sulfate extraction. However, the nitric acid solutions with pH of about 2 were only moderately effective and extracted only 38–45% sulfate sulfur compared to 87% with 0.13 pH solution.

EXAMPLE 3

A 0.6 weight percent platinum isomerization dewaxing catalyst having a H/Pt of 1.38 and agglomeration of 1%, i.e., having 1% of its platinum in X-ray visible large particles, was severely sintered at 450° C. resulting in H/Pt of 0.36 and agglomeration of 41%. The sintered catalyst was then subjected to raw feed testing with light virgin gas oil. The resulting coked catalyst was oxidatively regenerated at 450° C. for 95 hours to remove coke. The resulting catalyst had a sulfur content of 0.16%, a sulfur oxide ($SO_4^=$) content of 0.11% and platinum agglomeration of 69%. The catalyst was then extracted with an aqueous solution of $HNO_3$ having a pH of 0.4. The catalyst exhibited H/Pt of 0.12, a sulfur content of 0.03% and a sulfur oxide ($SO_4=$) content of only 0.02%. The extracted catalyst was then subjected to a chlorine treatment to disperse agglomerated platinum by exposure to a mixture of 10 torr $Cl_2$, 10 torr $H_2O$, 380 torr $O_2$ and nitrogen at 450° C. for four hours. The resulting catalyst had H/Pt of 0.64, a sulfur content of 0.04% and sulfur oxide ($SO_4=$) content of 0.03%. X-ray diffraction showed platinum agglomeration of 0.00%.

EXAMPLE 4

A 0.6 weight percent platinum isomerization dewaxing catalyst having a H/Pt of 1.28 was subjected to raw feed testing with light virgin gas oil. The resulting coked catalyst was then oxidatively regenerated at 450° C. for 12 hours to remove coke. The resulting catalyst had a sulfur content of 0.10%, a sulfur oxide ($SO_4=$) content of 0.10% and platinum agglomeration of 14%. The catalyst was then extracted with an aqueous solution of $HNO_3$ having a pH of 0.4. The catalyst exhibited H/Pt of 0.35, and platinum agglomeration of 14%. The extracted catalyst was then subjected to a chlorine treatment to disperse agglomerated platinum by exposure to a mixture of 10 torr $Cl_2$, 10 torr $H_2O$, 380 torr $O_2$ and nitrogen at 450° C. for four hours. The resulting catalyst had H/Pt of 1.10, and X-ray diffraction showed platinum agglomeration of 0.00%.

EXAMPLE 5

A 0.6 weight percent platinum isomerization dewaxing catalyst having a H/Pt of 1.28 was subjected to raw feed testing with light virgin gas oil. The resulting coked catalyst was oxidatively regenerated at 450° C. for 16 hours to remove coke. The resulting catalyst had a sulfur content of 0.12%, a sulfur oxide ($SO_4=$) content of 0.10% and platinum agglomeration of 21% and H/Pt of 0.33. The catalyst was then extracted with an aqueous solution of $HNO_3$ having a pH of 0.4. The catalyst had a sulfur content of 0.04% and a sulfur oxide ($SO_4=$) content of 0.04%. The extracted catalyst was then subjected to a chlorine treatment to disperse agglomerated platinum by exposure to a mixture of 10 torr $Cl_2$, 10 torr $H_2O$, 380 torr $O_2$ and nitrogen at 450° C. for four hours. The resulting catalyst had H/Pt of 1.03 and X-ray diffraction showed platinum agglomeration of 0%.

EXAMPLE 6

Example 5 was repeated except that the acid extraction step was omitted. After chlorine activation the catalyst had a H/Pt of 0.49, a sulfur content of 0.11% a sulfur oxide ($SO_4=$) content of 0.08% X-ray diffraction showed 11% platinum agglomeration.

TABLE 1

| Properties of Regenerated Catalyst | |
| --- | --- |
| As Received, Wt % | |
| C | 0.015 |
| S | 0.45 |
| S[a] | 0.38 |
| XRD, wt % Pt | 0.20 |
| Chemisorption[b] | |
| H/Pt | 0.05 |
| O/Pt | 0.09 |

[a]Wt % of sulfur in sulfur oxide forms.
[b]Chemisorption after 200° C. reduction

TABLE 2

Effect of Solution Type on Sulfur Oxides Removal from Regenerated Isomerization Catalyst

| Solution | Initial pH | wt % Sulfur Oxides Removal |
| --- | --- | --- |
| None | — | — |
| Deionized Water | 7.09 | 35 |
| Hydrogen Peroxide | 4.69 | 51 |
| Ammonium Nitrate | 5.55 | 47 |
| Ammonium Carbonate | 5.06 | 53 |
| Acetic Acid | 3.06 | 58 |
| Formic Acid | 2.65 | 71 |
| Nitric Acid | 0.13 | 87 |

TABLE 3

Comparison of the Pt Properties of Regenerated Isomerization Catalyst Before and After $H_2O_2$ Treatment

| | Regenerated | Extracted |
| --- | --- | --- |
| H/Pt Chemisorption[a] | 0.05 | 0.14 |
| O/Pt Chemisorption[a] | 0.09 | 0.15 |
| CO Adsorption [b] | 0.20 | 0.40 |
| XRD, Wt % Pt | 0.20 | 0.20 |

[a]Chemisorption after 200° C. Reduction
[b]Measured by FTIR

TABLE 4

Effect of pH on Sulfur Oxides Removal Using Various Dilute Nitric Acid Solutions

| Initial pH | wt % Sulfur Oxides Removal |
| --- | --- |
| 4.35 | 39 |
| 3.22 | 41 |
| 1.98 | 44 |
| 0.34 | 61 |
| 0.13 | 87 |

It is claimed:

1. A method for reactivating a sulfur oxide-poisoned, oxidatively regenerated, noble metal-containing zeolite catalyst whereby dispersion of said noble metal is enhanced, which comprises removing at least some of said sulfur oxides from said catalyst by contacting said catalyst with an aqueous solution containing a Bronsted acid compound having a dissociation constant ranging from about $1 \times 10^{-14}$ to about $2 \times 10^{-1}$ which has been added such that the resulting aqueous solution has a pH below about 7 and thereafter exposing said catalyst to noble metal dispersing conditions which comprise contacting said catalyst with halogen containing gas containing 2 to 20 torr chlorine, 200 to 4000 torr oxygen and above 0 to 50 torr water.

2. The method of claim 1 wherein said compound is an ammonium salt.

3. The method of claim 2 wherein said ammonium salt is selected from the group consisting of ammonium carbonate and ammonium nitrate.

4. The method of claim 1 wherein said compound is selected from the group consisting of nitric acid, carbonic acid and hydrogen peroxide.

5. The method of claim 1 wherein said compound is an organic acid.

6. The method of claim 5 wherein said organic acid is selected from the group consisting of acetic acid and formic acid.

7. The method of claim 1 wherein said compound is a hydrogen halide.

8. The method of claim 1 wherein said compound is hydrogen chloride.

9. The method of claim 1 wherein said compound is hydrogen fluoride.

10. The method of claim 1 wherein said aqueous solution contains hydrogen peroxide and hydrogen fluoride.

11. The method of claim 1 wherein said contacting is carried out at about 25° to 100° C., and about 15 to 600 psig for about 0.5 to 10 hours.

12. The method of claim 11 wherein said contacting is carried out at about 25° to 80° C. and about 15 to 400 psig for about 0.5 to 2 hours.

13. The method of claim 1 wherein said pH ranges from about 0.1 to 7.

14. The method of claim 1 wherein said pH ranges from about 0.1 to 5.

15. The method of claim 1 wherein said crystalline zeolite material comprises a large pore structure zeolite exhibiting a Constraint Index of less than about 1.

16. The method of claim 1 wherein said crystalline zeolitic material comprises an intermediate pore structure zeolite exhibiting a Constraint Index of from about 1 to about 12.

17. The method of claim 15 wherein said zeolite is selected from the group consisting of ZSM-3, ZSM-4, ZSM-12, ZSM-18, ZSM-20, zeolite beta, zeolite X and zeolite Y.

18. The method of claim 17 wherein said zeolite is selected from the group consisting of ZSM-5, ZSM-11, ZSM-5/ZSM-11 intermediate, ZSM-23, ZSM-35, ZSM-38 and ZSM-48.

19. The process of claim 1 wherein said catalyst is a composite of said zeolite material and a matrix.

20. The method of claim 19 wherein said matrix is alumina.

21. The method of claim 1 wherein said noble metal is selected from the group consisting of platinum, palladium, osmium, iridium and rhodium.

22. The method of claim 1 wherein said noble metal is platinum.

23. The method of claim 1 wherein said halogen gas contains nitrogen.

24. The method of claim 1 wherein said halogen containing gas contains 5 to 12 torr chlorine, 200 to 400 torr oxygen, above 0 to 10 torr water and nitrogen.

* * * * *